INVENTORS
William C. Gardiner
Hugh A. Mosher
Walter J. Sakowski
BY Adams, Forward and McLean
ATTORNEYS

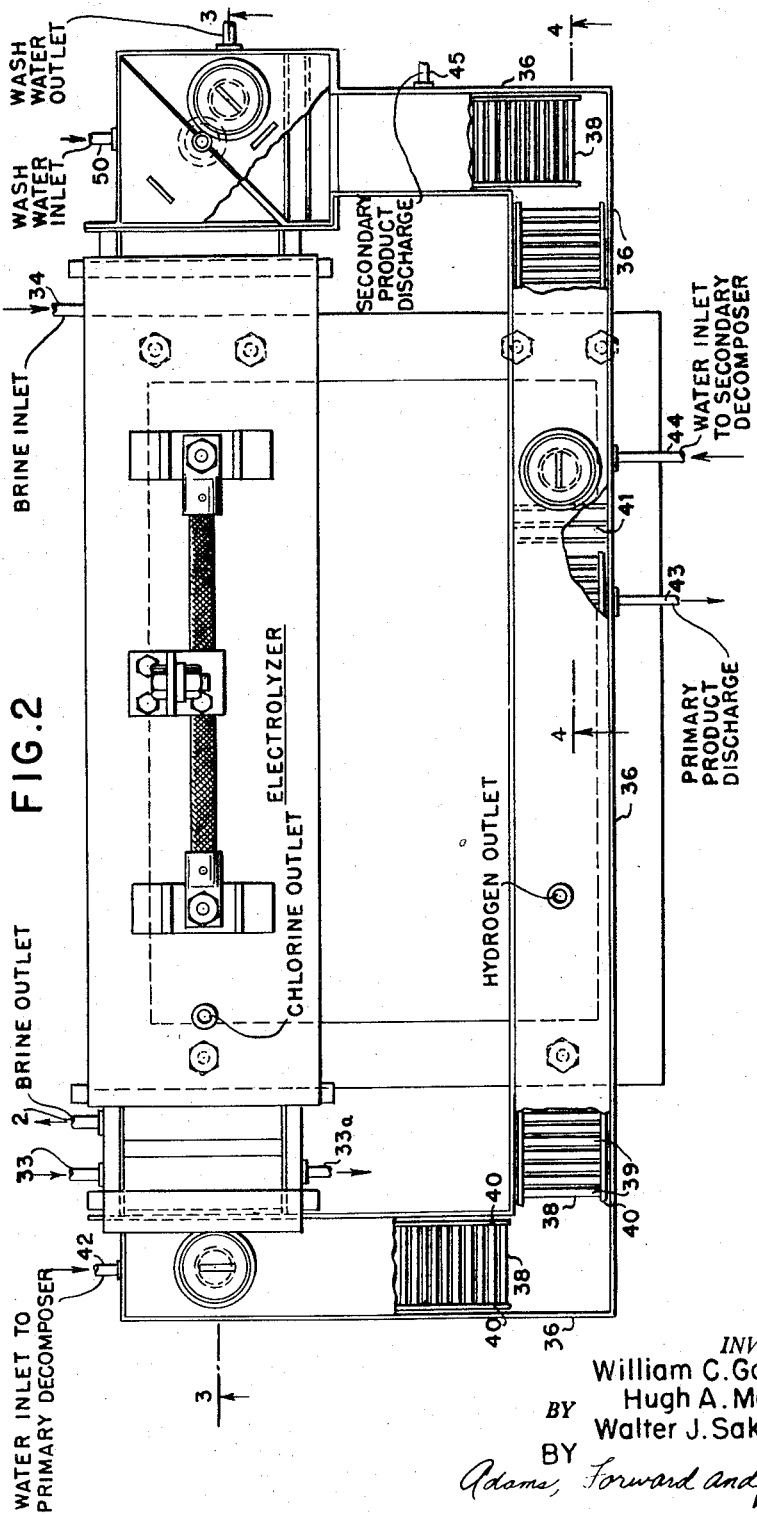

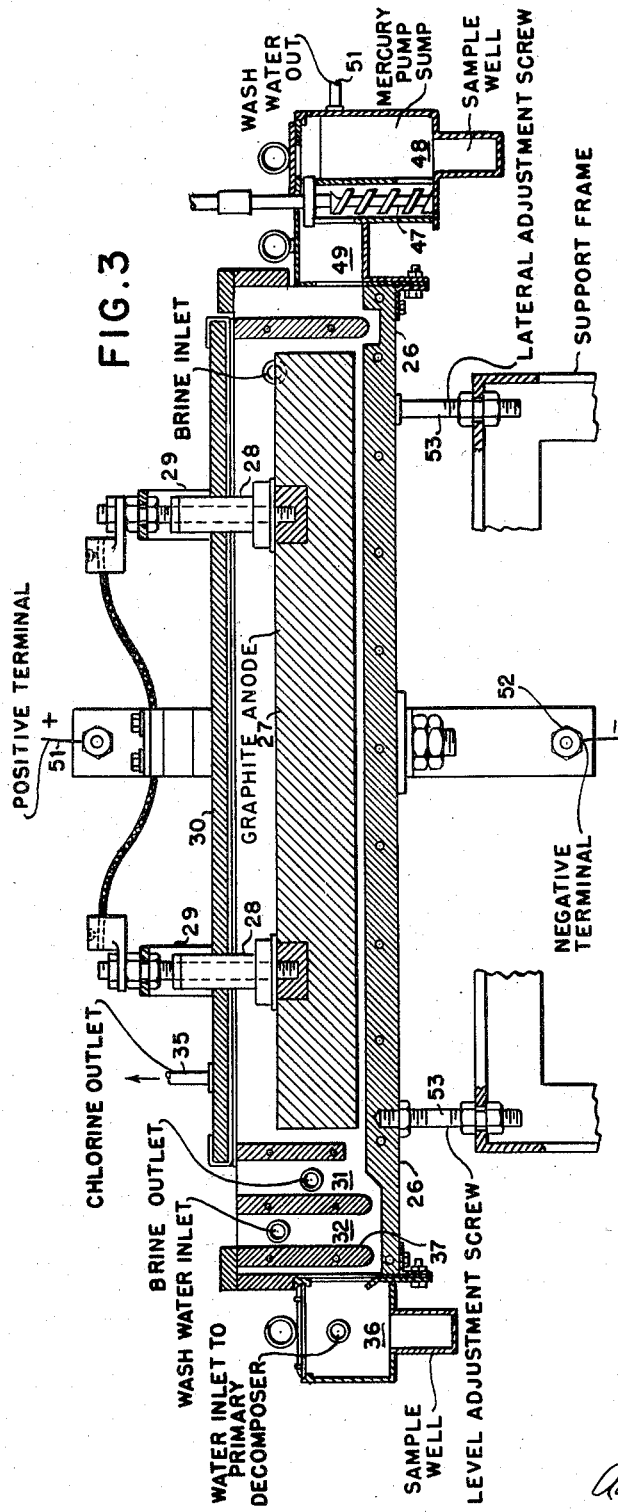
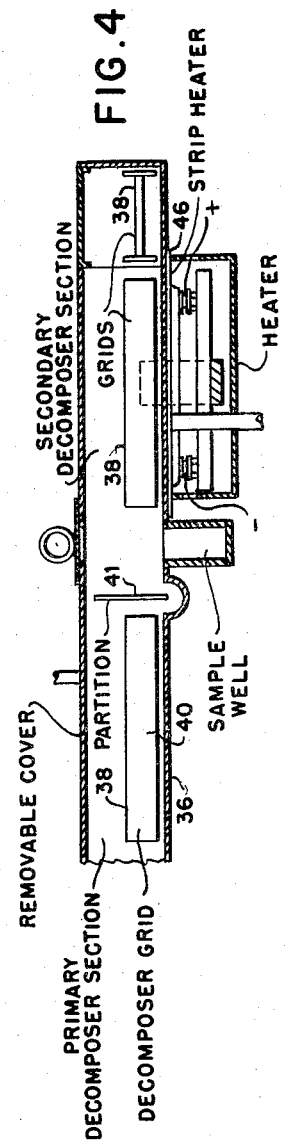

2,872,393
PRODUCTION OF LITHIUM HYDROXIDE

William C. Gardiner, Niagara Falls, Hugh A. Mosher, Lewiston, and Walter J. Sakowski, Youngstown, N. Y., assignors to Olin Mathieson Chemical Corporation, a corporation of Virginia Application December 3, 1954, Serial No. 472,802

3 Claims. (Cl. 204—99)

Our invention relates to an improved method for the production of chlorine and aqueous lithium hydroxide by electrolyzing a strong aqueous solution of lithium chloride in a mercury cathode cell. The electrolysis results in the production of chlorine gas and lithium amalgam, which is thereafter decomposed by reaction with water to form the aqueous solution of lithium hydroxide.

Prior to our present invention, it has been proposed to produce chlorine and alkali metal hydroxide by electrolyzing an alkali metal chloride brine in a mercury cell to produce chlorine gas and alkali metal amalgam. Such amalgam is generally reacted with water to form an aqueous solution of the alkali metal hydroxide and at the same time to remove the alkali metal from solution with the mercury, so that the mercury can then be returned to the mercury cell to serve in the electrolysis of further quantities of alkali metal chloride brine.

Lithium chloride commonly has associated with it other alkali metal chlorides and alkaline earth metal chlorides such as sodium chloride and potassium chloride as an impurity. We have discovered that an aqueous solution of lithium hydroxide of reduced content of other alkali metal and alkaline earth metal hydroxides is obtained if the lithium amalgam, which also contains other alkali metals or alkaline earth metals as an impurity, is decomposed in stages. Thus, we have found that the aqueous solution of lithium hydroxide produced in the first decomposition stage is of increased purity in comparison with the aqueous lithium hydroxide produced in a second or later decomposition stage.

Hence, our invention contemplates a process of the type described in which the lithium amalgam is decomposed in more than one stage or step. The amount of lithium present in the amalgam leaving the cell and decomposed in the first step can be varied widely, depending upon the amount of more pure aqueous lithium hydroxide which it is desired to produce and the purity desired for that product, but generally will be within the range from about 50 to 90 percent by weight.

For a more complete understanding of our invention, reference is made to the accompanying drawings in which:

Fig. 2 is a plan view of the mercury cell and decomposer employed;

Fig. 3 is a longitudinal sectional elevation taken through the cell; and

Fig. 4 is a partial longitudinal sectional elevation taken through the decomposer.

Figure 1:
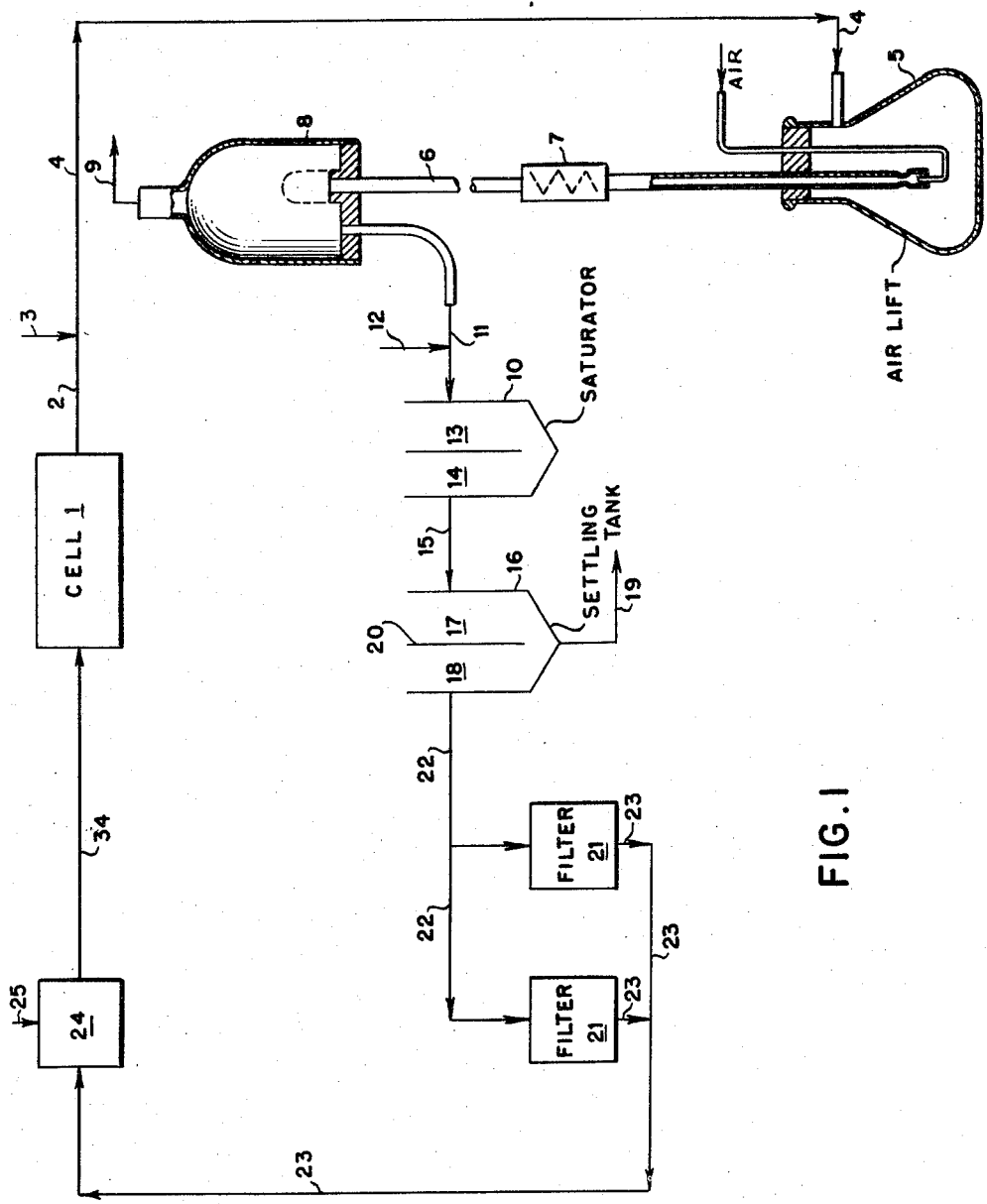
Fig. 1 depicts in a highly diagrammatic form an arrangement of apparatus in which our invention has been carried out, this figure being directed primarily to the lithium chloride brine flow.

Referring specifically to Fig. 1 the lithium chloride brine at a temperature of the order of 70° C. left the cell 1 through line 2 and was acidified continuously by a stream of 4 percent by weight solution of reagent grade hydrochloric acid introduced through line 3. The acidified brine then passed through line 4 through two air lift type pumps arranged in series which served the double purpose of raising the brine through line 6 to an upper level and at the same time dechlorinating the brine by aeration. Only one of these pumps (5) is shown in Fig. 1. An auxiliary heater 7 made of an electrical resistance wire supplied heat to the brine as it left the first air lift to insure complete dechlorination in the second air lift, since temperature drops of approximately 10 or 15° C. were experienced during the aeration. Vessel 8 served as a means for separating the air and gaseous chlorine from the dechlorinated brine, the air and chlorine passing out of the system through line 9 and the dechlorinated brine entering saturator 10 through line 11. Before entering the saturator, a 4 percent by weight aqueous solution of lithium hydroxide was introduced through line 12 in order to bring the pH of the brine to about 8 or 9 before it entered saturator 10.

Saturator 10 was provided with an inlet compartment 13 and an exit compartment 14, and solid lithium chloride was added to the inlet compartment and stirred into the solution. The pH of the solution at this point was about 8 or 9 and the temperature was about 45 to 50° C. Some settling of solids occurred in the second compartment of the saturator prior to the passage of the brine through line 15 to a five gallon settling tank 16. About six grams of lithium carbonate (0.5 gram of lithium carbonate per liter of brine) were added per hour at the saturator to precipitate the impurities which settled out in the settling tank 16. Here again, this device was provided with two compartments 17 and 18, this being necessary due to the fact that ferric hydroxide floc rose to the surface of compartment 17 while the carbonates (calcium carbonate and magnesium carbonate) settled to the bottom from which they were removed by means of line 19. The ferric hydroxide floc was retained by the central partition 20, the brine passing underneath the compartment and then up through the second or outlet compartment to sand filters 21 by means of lines 22.

The sand filters were composed of three layers consisting of coarse gravel, coarse sand and fine sand. The filters were operated in parallel to permit continuous filtration and each had a surface area of 0.95 square foot. The filtered brine was brought by means of lines 23 to a mixing tank 24 having a capacity of about 2 liters, where the pH of the brine was adjusted to about 3 by admixing with it hydrochloric acid introduced through line 25 and the temperature was brought up to about 50 or 60° C.

Turning now to Figs. 2, 3 and 4, the electrolysis was carried out in a cell 1 provided with a steel bottom 26 and Lucite insulating walls. The electrolyzer compartment was 25 inches long, 5 inches wide and 4 inches high and the graphite anode 27 was suspended by two anode posts 28 from yokes 29 on the rubber lined steel cover 30 which allowed for anode adjustments during operation. The electrolyzer was equipped with a compartment 31 for separation of brine and with a compartment 32 for washing the amalgam with distilled water introduced through line 33. The wash water left compartment 32 through line 33a.

The brine was fed to the electrolyzer through line 34 at a rate of about 200 cc. per minute at a pH of about 3 to 5, a temperature of about 50 to 60° C. and a specific gravity of about 1.28 (44.4 percent by weight lithium chloride). The brine left the cell through line 2 at a temperature of about 65 to 70° C. and at a concentration of about 42 percent by weight of lithium chloride. The chlorine gas was drawn off through line 35 by a porcelain aspirator (not shown) into the sewer where it was continuously neutralized by caustic addition.

Amalgam decomposition was carried out in horizontal decomposer 36, into which the amalgam entered from compartment 32 by passage under partition 37. The decomposition of the amalgam was accomplished using a plurality of decomposer grids 38 composed of ¼ inch graphite rods 39 mounted between two steel strips 40 and spaced about 1/16 inch apart. These grids were 7 inches long (in a direction parallel to the flow of the amalgam) and three inches wide (in a direction across the flow of the amalgam). The amalgam in the decomposer was maintained at a depth of ¼ inch and reached to within ¹⁄₁₆ inch of the graphite rods. The grids were covered by about 1 inch in depth of the lithium hydroxide solution formed. The amalgam was not allowed to touch the grids because the formation of solid caustic eventually choked off the decomposition. All surfaces which did not amalgamate, and which were sealed off by the mercury, built up layers of solid caustic which stopped the flow of mercury. Because of this, lithium amalgam is best handled in troughs and in a horizontal decomposer for ready accessibility for clearing of solid caustic.

In order to produce a product of high purity, the decomposer was divided into two compartments which were separated by means of a partition 41. Distilled water was introduced into the first compartment through line 42 and lithium hydroxide solution left it through line 43. Likewise, distilled water was introduced into the second compartment through line 44 and aqueous lithium hydroxide left the second compartment through line 45. In the first compartment, 80 percent by weight of the lithium present in the amalgam leaving the cell was decomposed, essentially the remainder of the lithium being decomposed in the second compartment. The differences in the two products (aqueous lithium hydroxide) was readily noticeable, since the primary product was water clear while the secondary product was heavily clouded with a white suspension. This white suspension, namely magnesium hydroxide and calcium hydroxide, agglomerated on standing and could be removed. The temperature in the decomposer averaged about 70° C., and in order to insure complete decomposition in the secondary decomposer additional heat was provided by an electric strip heater 46 fastened to the bottom of the secondary decomposer.

The mercury circulation in the cell and decomposer was maintained by a mercury pump 47 located at the brine inlet end of the cell. This pump operated to lift the mercury from sump 48 to the mercury inlet 49 of the cell at a rate of about 15 pounds per minute. The mercury returning to the cell contained, during normal operation, from 0 to 0.0018 percent by weight of lithium. To prevent the formation of solid caustic and powdered mercury at the pump, it was maintained flooded with water which entered through line 50 and left through line 51. The amalgam entering the primary decomposer averaged about 0.02 percent by weight of lithium, while that entering the secondary decomposer container about 0.005 percent by weight lithium.

As those skilled in the art will understand, the cell comprised, in addition to the parts mentioned above, still other equipment, such as a positive terminal 51 electrically connected to the anode, a negative terminal 52 electrically connected to the cathode, and adjustment screws 53 for leveling or adjusting the slope of the cell.

Table I below sets forth typical operating data for a period of seven successive days during which time the cell and decomposer were producing lithium hydroxide in the form of monohydrate at the rate of approximately 25 pounds per day. Similarly Table II sets forth typical operating conditions for seven successive days. Where it is desired to produce lithium hydroxide in solid form, the aqueous solution of lithium hydroxide coming from the decomposer can be heated to evaporate the water therefrom, in accordance with procedures which are well understood in the art.

*Table I*

| | | | | | | | |
|---|---|---|---|---|---|---|---|
| Current, amperes | 300 | 300 | 300 | 300 | 300 | 300 | 300 |
| Voltage, volts | 4.89 | 4.77 | 4.65 | 4.73 | 4.66 | 4.74 | 4.83 |
| Inlet Brine: | | | | | | | |
| pH | 5.90 | 4.41 | 4.72 | 5.34 | 4.82 | 5.48 | 4.78 |
| Temp., °C | 52.7 | 51.5 | 55.6 | 52.0 | 51.8 | 51.1 | 54.7 |
| Sp. Gr | 1.243 | 1.245 | 1.256 | 1.261 | 1.261 | 1.252 | 1.255 |
| Concentration, wt. percent LiCl | 40.5 | 41.0 | 42.5 | 42.5 | 42.4 | 41.4 | 41.5 |
| Flow rate, cc./min | 199 | 199 | 200 | 200 | 199 | 199 | 199 |
| Outlet Brine: | | | | | | | |
| Temp., °C | 52.0 | 51.5 | 55.4 | 51.7 | 47.8 | 47.9 | 53.8 |
| OCl, g. per l | 0.445 | 0.382 | 0.329 | 0.293 | 0.352 | 0.435 | 0.416 |
| Titer [1] | 10.2 | 8.8 | 9.7 | 9.8 | 10.0 | 10.0 | 15.9 |
| Outlet Amal., wt percent Li | 0.0173 | 0.0228 | 0.0174 | 0.0154 | 0.0115 | 0.0246 | 0.0250 |
| Mid Amal., wt. percent Li | 0.00645 | 0.00970 | 0.00740 | 0.00542 | 0.00328 | 0.0118 | 0.0116 |
| End Amal., wt. percent Li | 0.00416 | 0.00435 | 0.00371 | 0.00296 | 0.00105 | 0.00843 | 0.00465 |
| Primary Product: | | | | | | | |
| Temp., °C | 56.8 | 56.6 | 56.9 | 55.8 | 58.6 | 56.2 | 59.1 |
| Sp. Gr | 1.094 | 1.090 | 1.087 | 1.094 | 1.096 | 1.091 | 1.089 |
| Concentration, wt. percent LiOH | 10.2 | 9.8 | 9.5 | 10.1 | 10.5 | 9.9 | 9.9 |
| Secondary Product: | | | | | | | |
| Temp., °C | 53.6 | 53.6 | 55.8 | 53.7 | 47.5 | 46.8 | 49.3 |
| Sp. Gr | 1.091 | 1.081 | 1.085 | 1.086 | 1.087 | 1.089 | 1.087 |
| Concentration, wt. percent LiOH | 9.8 | 8.8 | 9.2 | 9.2 | 9.1 | 9.2 | 9.1 |
| OCl in aerated brine, g. per l | 0.0284 | 0.0167 | 0.0452 | 0.0232 | 0.0271 | 0.0245 | 0.0413 |

[1] Cc. of 0.1 normal HCl to neutralize 200 cc. sample.

*Table II*

| | | | | | | | |
|---|---|---|---|---|---|---|---|
| Current, amperes | 400 | 400 | 363 | 392 | 396 | 395 | 388 |
| Voltage, volts | 4.41 | 4.45 | 4.71 | 4.73 | 4.76 | 4.82 | 4.83 |
| Inlet Brine: | | | | | | | |
| pH | 5.00 | 4.36 | 5.32 | 5.77 | 5.29 | 5.10 | 5.66 |
| Temp., °C | 58.7 | 57.5 | 59.1 | 58.9 | 59.9 | 55.3 | 56.4 |
| Sp. Gr | 1.238 | 1.245 | 1.248 | 1.244 | 1.248 | 1.251 | 1.249 |
| Concentration, wt. percent LiCl | 40.2 | 41.1 | 42.3 | 41.2 | 42.4 | 42.5 | 42.1 |
| Flow rate, cc./min | 200 | 200 | 201 | 199 | 199 | 193 | 201 |
| Outlet Brine: | | | | | | | |
| Temp., °C | 67.5 | 67.1 | 66.3 | 69.2 | 73.5 | 71.3 | 68.8 |
| OCl, g. per l | 0.437 | 0.418 | 0.386 | 0.383 | 0.336 | 0.371 | 0.315 |
| Titer [1] | 20.9 | 18.9 | 22.6 | 25.9 | 26.6 | 21.0 | 21.1 |
| Outlet Amal. wt. percent Li | 0.0222 | 0.0359 | 0.0168 | 0.0191 | 0.0194 | 0.0185 | 0.0189 |
| Mid. Amal., wt. percent Li | 0.0080 | 0.0134 | 0.00180 | 0.0082 | 0.0081 | 0.00508 | 0.00389 |
| End Amal., wt. percent Li | 0.00386 | 0.0097 | 0.00039 | 0.0040 | 0.0024 | 0.00125 | 0.00104 |
| Primary Product: | | | | | | | |
| Temp., °C | 62.5 | 59.8 | 66.8 | 68.3 | 71.4 | 71.0 | 70.8 |
| Sp. Gr | 1.094 | 1.090 | 1.092 | 1.093 | 1.090 | 1.095 | 1.096 |
| Concentration, wt. percent LiOH | 10.5 | 9.9 | 10.4 | 10.6 | 10.5 | 11.1 | 11.1 |
| Secondary Product: | | | | | | | |
| Temp., °C | 67.0 | 64.5 | 61.3 | 62.0 | 69.0 | 62.3 | 63.3 |
| Sp. Gr | 1.090 | 1.089 | 1.078 | 1.084 | 1.091 | 1.082 | 1.086 |
| Concentration, wt. percent LiOH | 10.2 | 10.0 | 8.8 | 9.4 | 10.5 | 9.3 | 9.7 |
| OCl in aerated brine, g. per l | 0.0132 | 0.0370 | 0.0404 | 0.0223 | 0.0113 | 0.0103 | 0.0143 |

[1] Cc. of 0.1 normal HCl to neutralize 200 cc. sample.
NOTE.—Anode had been lowered prior to operations at 400 amperes.

In a typical operation according to the conditions described above approximately 80 percent by weight of the lithium present in the amalgam leaving the cell was decomposed in the first compartment to produce a primary sample of 4.48 normal lithium hydroxide and essentially the remainder of the lithium was decomposed in the second compartment to produce a secondary sample of 3.96 normal lithium hydroxide. On a dry basis, the primary sample contained 26 parts per million of potassium and 0.03 percent by weight of sodium, whereas the secondary sample contained 210 parts per million of potassium and 0.44 percent by weight of sodium.

We claim:

1. A method for the production of chlorine and an aqueous solution of lithium hydroxide which comprises electrolyzing an aqueous solution of lithium chloride containing as an impurity at least one material selected from the group consisting of alkali metal chlorides and alkaline earth metal chlorides other than lithium chloride in a mercury cell to form chlorine and lithium amalgam, and partially decomposing the amalgam by contacting it with fresh water to form an aqueous solution of lithium hydroxide in a first decomposition stage and completing the decomposition of such amalgam with fresh water in at least one succeeding decomposition stage.

2. A method according to claim 1 in which from 50 to 90 percent by weight of the lithium present in the amalgam is decomposed in the first stage.

3. A method according to claim 1 in which said impurity is sodium chloride.

References Cited in the file of this patent

UNITED STATES PATENTS 588,276    Kellner _____ Aug. 17, 1897

FOREIGN PATENTS 453,517    Great Britain _____ Sept. 14, 1936